United States Patent
Garcia

[19]

[11] Patent Number: 5,988,536
[45] Date of Patent: Nov. 23, 1999

[54] ELECTRO-MECHANICAL DOSIMETER OF SEEDS AND FERTILIZER

[76] Inventor: Roberto Luis Garcia, Av. Kennedy 2086, B° 1° de mayo (Rosario) C.P. 2000, Argentina

[21] Appl. No.: 08/986,595

[22] Filed: Dec. 8, 1997

[30] Foreign Application Priority Data

Dec. 9, 1996 [AR] Argentina .................. P 96 01 05559

[51] Int. Cl.⁶ .................................................. A01C 3/06
[52] U.S. Cl. ............................................................ 239/689
[58] Field of Search .................................. 239/650, 651, 239/653, 665, 666, 668, 669, 676, 677, 679, 681, 682, 684, 689; 222/415; 111/15, 25

[56] References Cited

U.S. PATENT DOCUMENTS

| | | | |
|---|---|---|---|
| 4,085,862 | 4/1978 | Steffen | 221/8 |
| 4,145,980 | 3/1979 | Boots | 111/1 |
| 4,381,080 | 4/1983 | van der Lely et al. | 239/666 |
| 4,725,005 | 2/1988 | Wiegelmann | 239/682 |

FOREIGN PATENT DOCUMENTS

| | | | |
|---|---|---|---|
| 3931835 A1 | 9/1989 | Germany | 239/665 |
| 2200827A | 8/1988 | United Kingdom | 239/665 |

*Primary Examiner*—Andres Kashnikow
*Assistant Examiner*—Jorge Bocanegra
*Attorney, Agent, or Firm*—Smith & Danamraj, P.C.

[57] ABSTRACT

An electro-mechanical dosimeter of granulate, such as seeds and fertilizer. The electro-mechanical dosimeter includes a feeder tube for holding the granulate, a cylindrical body attached to the feeder tube, and a conical plate attached to the cylindrical body for rotating the granulate horizontally outward towards the perimeter of the cylindrical body. The feeder tube has a first opening from which the granulate is feed to the plate and a volume register surrounding the feeder tube at the first opening. The electro-mechanical dosimeter also includes a motor for rotating the plate around a central axis of the cylindrical body, and a second opening on the cylindrical body from which the granulate exits the cylindrical body to a discharge tube where the granulate is dispensed at a controlled and even rate. The volume of the granulate may be changed by adjusting the size of the first opening by raising and lowering the volume register upon the feeder tube.

12 Claims, 2 Drawing Sheets

ELECTRO-MECHANICAL DOSIMETER OF SEEDS AND FERTILIZER

CROSS REFERENCE TO RELATED FOREIGN APPLICATION

This application claims foreign priority from Argentina Patent Ser. No. P96 10 05559, titled "Dosificador Electromecanico de semillas y fertilizantes," filed Dec. 9, 1996 and hereby incorporated by reference as if quoted in its entirety herein.

BACKGROUND OF THE INVENTION

1. Technical Field of the Invention

This invention relates to agricultural products, and, more particularly, to an electro-mechanical dispenser for granulate, such as seed or fertilizer.

2. Description of Related Art

In order to increase the production of food, it is well known that farmers use various machines for planting and fertilizing fields. For example, a farmer may utilize a planting machine pulled behind a tractor. The planting machine usually includes at least one drum or hopper which holds a supply of seeds to be planted and some means for dispensing the seeds. However, existing machines have not been able to achieve precise control of the rate at which the seeds are dispensed. As a result, uneven distribution of the seeds in the field results. Additionally, the farmer cannot accurately estimate the amount of fertilizer or any other granulate that will be required to cover his fields at a desired coverage rate.

Thus, it would be a distinct advantage to have an apparatus for dispensing granulate in exact amounts upon a field. It is an object of the present invention to provide such an apparatus.

SUMMARY OF THE INVENTION

In one aspect, the present invention is an electro-mechanical dispenser for dispensing granulate. The electro-mechanical dispenser includes a feeder tube for holding the granulate and supplying the granulate to the dispenser. The feeder tube has a bottom end and a first opening in a lateral side of the bottom end of the feeder tube. The electro-mechanical dispenser also includes a vertical cylindrical body attached to the feeder tube so that the bottom end of the feeder tube is inside the cylindrical body. The cylindrical body has an inside surface and a second opening in a lateral side of the cylindrical body. The second opening faces a direction approximately 180 degrees from the first opening in the feeder tube. In addition, the electro-mechanical dispenser also includes a horizontal circular plate rotatably mounted in the cylindrical body adjacent the bottom end of the feeder tube. The plate has a perimeter edge at the height of the second opening. The perimeter edge is adjacent the inside surface of the cylindrical body. The electro-mechanical dispenser also includes means for rotating the circular plate, causing granulate which passes through the first opening onto the plate to move to the perimeter edge of the plate. The granulate is, thus, evenly dispersed in a line around the edge of the circular plate due to the rotation of the plate and friction with the inside surface of the cylindrical body, causing the granulate to fall at a steady and controlled rate through the second opening.

In another aspect, the present invention is an electro-mechanical dispenser for dispensing granulate. The electro-mechanical dispenser includes a feeder tube for holding the granulate and supplying the granulate to the dispenser. The feeder tube has a bottom end and a first opening in a lateral side of the bottom end of the feeder tube. The electro-mechanical dispenser also includes a vertical cylindrical body attached to the feeder tube so that the bottom end of the feeder tube is inside the cylindrical body. The cylindrical body has an inside surface and a second opening in a lateral side of the cylindrical body. The second opening faces a direction approximately 180 degrees from the first opening in the feeder tube. In addition, the electro-mechanical dispenser also includes a conically shaped plate rotatably mounted in the cylindrical body adjacent the bottom end of the feeder tube. The plate has a horizontal perimeter edge at the height of the second opening. The perimeter edge is adjacent the inside surface of the cylindrical body. The electro-mechanical dispenser also includes a motor for rotating the conical plate. Granulate which passes through the first opening onto the plate moves to the perimeter edge of the plate due to gravity and the rotation of the plate. The granulate becomes evenly dispersed in a line around the horizontal perimeter edge of the conical plate due to the rotation of the plate and friction with the inside surface of the cylindrical body. When the granulate reaches the second opening, it falls at a steady and controlled rate through the second opening and out a vertical discharge tube. The discharge tube is mounted adjacent to the second opening on an outer surface of the cylindrical body.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

The present invention is an electro-mechanical dosimeter of seeds and fertilizer.

Figure 1:
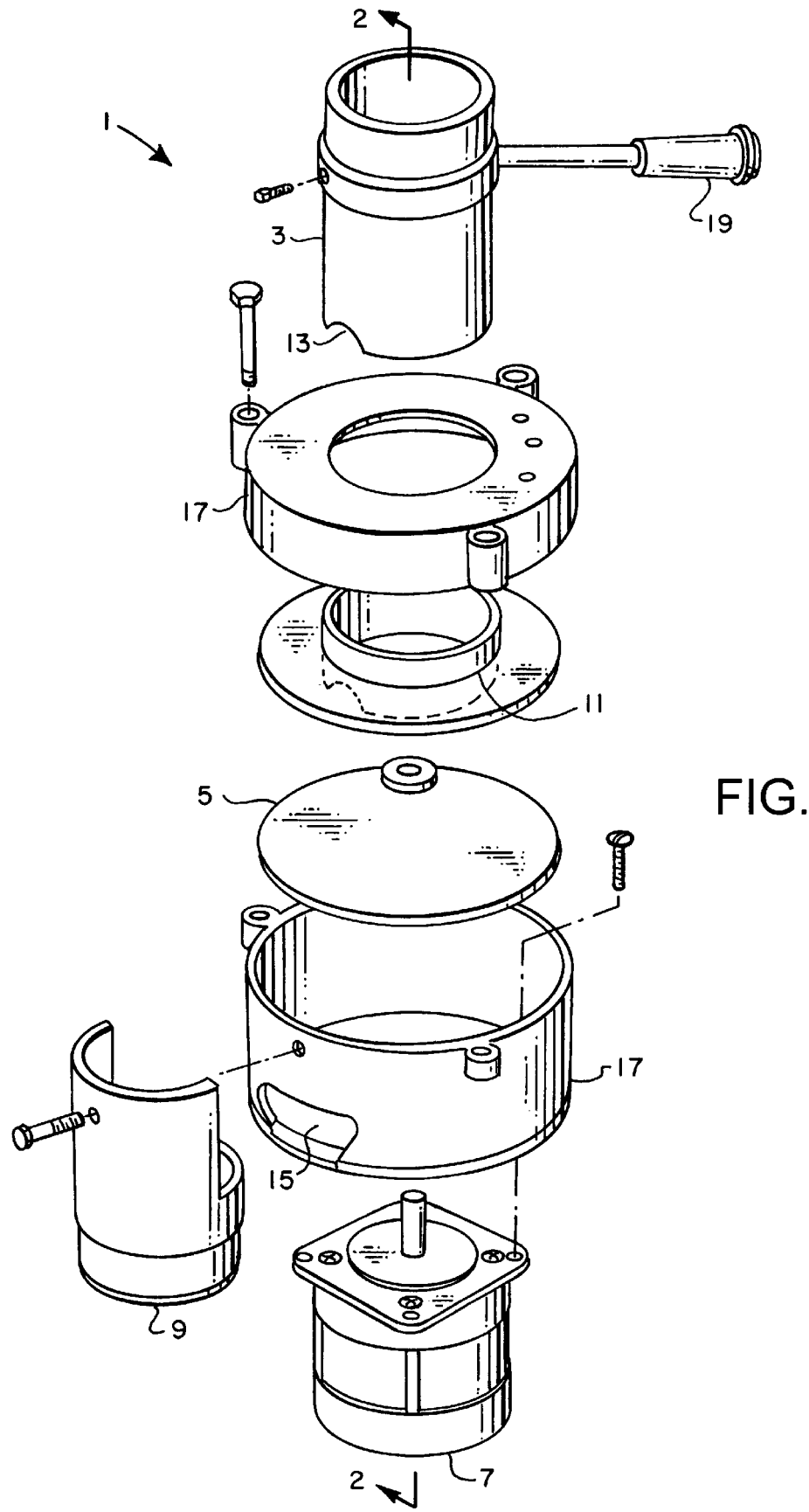
FIG. 1 is an exploded perspective view of the preferred embodiment of the electro-mechanical dosimeter of the present invention.

FIG. 1 is an exploded perspective view of the preferred embodiment of an electro-mechanical dosimeter 1 of the present invention. The electro-mechanical dosimeter 1 includes a feeder tube 3, a plate 5, a motor 7, a discharge tube 9, a volume register 11, an opening 13, a window 15, body 17, and a handle 19.

Figure 2:
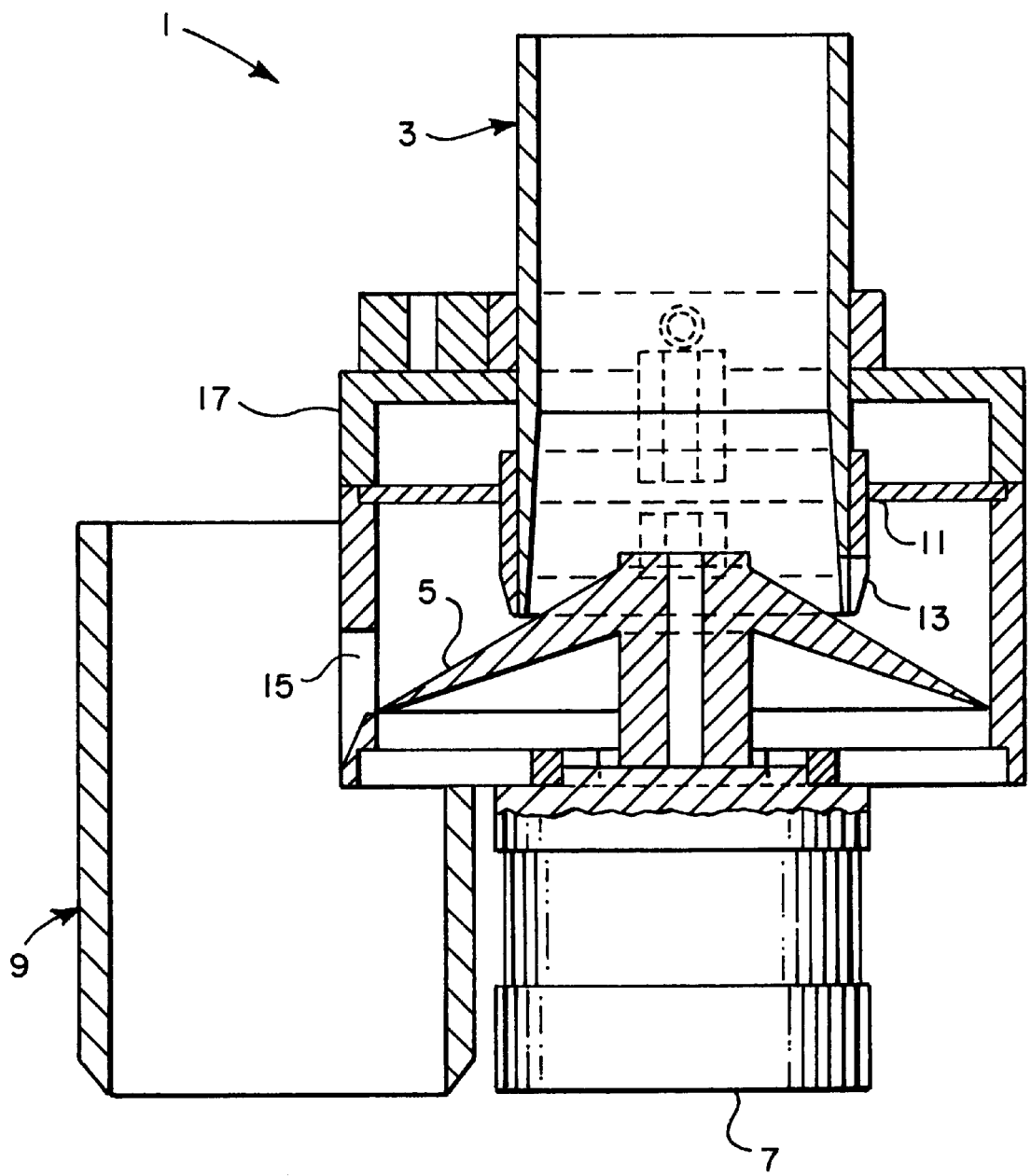
FIG. 2 is a side cross-sectional view of the electro-mechanical dosimeter of FIG. 1 taken along line 2—2.

FIG. 2 is a side cross-sectional view of the electro-mechanical dosimeter of FIG. 1 taken along line 2—2. Referring to FIGS. 1 and 2, the feeder tube 3 is located at the top of the electro-mechanical dosimeter 1. Granulate (e.g., seeds and fertilizers) is loaded into the top portion of the feeder tube 3 from, for example, a drum or hopper. The feeder tube 3 may be of any shape to hold the granulate. In the preferred embodiment of the present invention, the feeder tube 3 is helicoid-shaped. At the bottom of the feeder tube 3 is the plate 5. The plate may be flat or conical in shape. In the preferred embodiment, the plate 5 is conically-shaped. The plate 5 rotates around a central axis of the feeder tube 3. As depicted in FIGS. 1 and 2, the plate 5 is a single plate. However, in an alternate embodiment of the present invention, the electro-mechanical dosimeter 1 has a plurality of plates 5. The motor 7 rotates the plate 5 around the central axis of the feeder tube 3. The motor 7 may be electrically, hydraulically, or pneumatically driven and may drive the plate in either a clockwise or counterclockwise direction.

The body 17 surrounds the feeder tube 3 and the plate 5. In the preferred embodiment of the present invention, the body 17 is cylindrical. The volume register 11 is a collar surrounding an outer circumference of the feeder tube 3.

The opening 13 is located at the bottom of the feeder tube 3 and the plate 5. The opening 13 may be one or more exits which allow seeds to exit the feeder tube onto the top surface of the plate 5. The window 15 is located on the perimeter of the body 17 on the opposite side of the feeder tube from the opening 13 (i.e., the window faces a direction approximately 180 degrees from the direction of the opening 13 in the feeder tube 3). The window 15 allows seeds around the perimeter of the plate 5 to fall into the discharge tube 9. In an alternate embodiment, the discharge tube 9 is a plurality of discharge tubes surrounding the body wall 17. The handle 19 is attached to the feeder tube 3 and allows the feeder tube 3 to be rotated about its vertical axis. The electro-mechanical dosimeter 1 may be constructed of metal, plastic, rubber, fiber, or glass.

The operation of the electro-mechanical dosimeter 1 when evenly dispensing seeds will now be explained. The seeds first enter the top of the feeder tube 3 from a drum or hopper. While the seeds are within the feeder tube 3, the plate 5 is rotated about the central axis of the feeder tube 3 by the motor 7. Near the top surface of the plate 5, the seeds are forced outward against the inside surface of the feeder tube 3 by centrifugal force and by gravity due to the inclination of the conical plate 5. The seeds then exit the feeder tube 3 through the opening 13 and continue to move outward on the top surface of the plate 5 until the seeds rest against the inside surface of the body 17. As the plate 5 continues to rotate, the seeds become dispersed in a line around the perimeter of the plate 5 due to friction between the seeds and the inside surface of the body 17. As seeds in the line reach the window 15, they fall through the window 15 into the discharge tube 9. The seeds then fall evenly dispersed upon the field.

In order to change the volume of granulate dispensed by the electro-mechanical dosimeter 1, the volume register 11 may be raised or lowered to adjust the height of the opening 13. The volume of granulate exiting the feeder tube 3 may also be changed by rotating the feeder tube 3 about its vertical axis in order to adjust the width of the opening 13 by moving the handle 19. Additionally, the rotation speed of motor 7 may be adjusted to meter the granulate through the discharge tube with great exactness. For example, if the motor 7 rotates the plate 5 at a faster speed, the granulate is dispensed at a greater rate. If the plate 5 is rotated at a slow speed, the granulate is released at a decreased rate.

It is thus believed that the operation and construction of the present invention will be apparent from the foregoing description. While the apparatus shown and described has been characterized as being preferred, it will be readily apparent that various changes and modifications could be made therein without departing from the spirit and scope of the invention as defined in the following claims.

What is claimed is:

1. An electro-mechanical dispenser for dispensing granulate comprising:
   a feeder tube for holding said granulate and supplying the granulate to the dispenser, said feeder tube having a bottom end and a first opening in a lateral side thereof at the bottom end;
   a vertical cylindrical body attached to the feeder tube so that the bottom end of the feeder tube is inside the cylindrical body, said cylindrical body having an inside surface and a second opening in a lateral side of the cylindrical body, said second opening facing a direction approximately 180 degrees from said first opening in said feeder tube;
   a horizontal circular plate rotatably mounted in the cylindrical body adjacent the bottom end of the feeder tube, said plate having a perimeter edge at the height of said second opening, said perimeter edge being adjacent the inside surface of the cylindrical body; and
   means for rotating the circular plate, thereby causing granulate which passes through the first opening onto the plate to move to the perimeter edge of the plate;
   whereby granulate is evenly dispersed in a line around the edge of the circular plate due to the rotation of the plate and friction with the inside surface of the cylindrical body, and said granulate falls at a steady and controlled rate through said second opening.

2. The electro-mechanical dispenser of claim 1, farther comprising a vertical discharge tube for guiding the granulate from the second opening to a field, said discharge tube mounted adjacent to the second opening on an outer surface of the cylindrical body.

3. The electro-mechanical dispenser of claim 1, wherein said means for rotating the circular plate is a motor.

4. The electro-mechanical dispenser of claim 3, wherein said motor is electrically driven.

5. The electro-mechanical dispenser of claim 3, wherein said motor is pneumatically driven.

6. The electro-mechanical dispenser of claim 3, wherein said motor is hydraulically driven.

7. The electro-mechanical dispenser of claim 1, further comprising a volume register for controlling an amount of granulate which exits the feeder tube, wherein said feeder tube rotates about a vertical axis of the feeder tube in relation with said volume register to change a size of the first opening.

8. The electro-mechanical dispenser of claim 1, further comprising a volume register slidably mounted around the bottom end of a circumference of the feeder tube, said volume register adjusting a size of the first opening by sliding up and down the circumference of the feeder tube.

9. The electro-mechanical dispenser of claim 1, wherein said circular plate is conically shaped.

10. The electro-mechanical dispenser of claim 1, wherein said circular plate is flat.

11. The electro-mechanical dispenser of claim 1 wherein the feeder tube, the body, and the plate are constructed of a material selected from the group consisting of:
   metal;
   plastic;
   rubber;
   fiber; and
   glass.

12. An electro-mechanical dispenser for dispensing granulate comprising:
   a feeder tube for holding said granulate and supplying the granulate to the dispenser, said feeder tube having a bottom end and a first opening in a lateral side thereof at the bottom end;
   a vertical cylindrical body attached to the feeder tube so that the bottom end of the feeder tube is inside the cylindrical body, said cylindrical body having an inside surface and a second opening, in a lateral side of the cylindrical body, said second opening facing a direction approximately 180 degrees from said first opening in said feeder tube;

a horizontal conical plate rotatably mounted in the cylindrical body adjacent the bottom end of the feeder tube, said plate having a perimeter edge at the height of said second opening, said perimeter edge being adjacent the inside surface of the cylindrical body;

a motor for rotating the conical plate, thereby causing granulate which passes through the first opening onto the plate to move to the perimeter edge of the plate, whereby granulate is evenly dispersed in a line around the edge of the circular plate due to the rotation of the plate and friction with the inside surface of the cylindrical body, and said granulate falls at a steady and controlled rate through said second opening; and a vertical discharge tube for guiding the granulate from the second opening to a field, said discharge tube mounted adjacent to the second opening on an outer surface of the cylindrical body.

* * * * *